US006320901B1

United States Patent
Arad et al.

(10) Patent No.: US 6,320,901 B1
(45) Date of Patent: Nov. 20, 2001

(54) METHOD FOR FAST OFF-LINE TRAINING FOR DISCRETE MULTITONE TRANSMISSIONS

(75) Inventors: Oren Arad, Ramat-Gan; Avi Gal, Ranana; Boaz Efroni, Natania, all of (IL)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/333,763

(22) Filed: Jun. 15, 1999

(51) Int. Cl.$^7$ ...................................................... H04L 5/16
(52) U.S. Cl. ..................... 375/222; 375/231; 375/354; 370/503; 708/305
(58) Field of Search ..................................... 375/231, 232, 375/222, 354, 366; 370/503, 506, 510, 513; 708/322, 323, 305

(56) References Cited

U.S. PATENT DOCUMENTS

| 5,285,474 | 2/1994 | Chow et al. | 375/13 |
| 5,461,640 | 10/1995 | Gatherer | 375/231 |
| 5,479,447 | 12/1995 | Chow et al. | 375/260 |
| 5,627,863 | 5/1997 | Aslanis et al. | 375/357 |
| 6,021,167 | * 2/2000 | Wu | 375/354 |

OTHER PUBLICATIONS

*Splitterless Asymmetric Digital Subscriber Line (ADSL) Transceivers*, International Telecommunications Union, ITU–T, G. 992.2, Feb. 17, 1999.

The Communications Handbook, J. Gibson, pp. 450–479, IEEE Press, 1997.

Time–Domain Equalizer Training for ADSL, M. Nafie et al., IEEE International Conference on Communication, pp. 1085–1089, Jun. 1997.

*Adaptive Filter Theory*, S. Haykin, Stochastic Gradient–Based Algorithms, Second Edition, Ch. 9, pp. 299–369, 1991.

Adapted Optimization Criterion for FDM–based DMT–ADSL Equalization, Van Kerchkhove et al., Proceedings of the 1996 IEEE International Conference on Communications, Part 3 of 3, vol. 3, Dallas, Texas, Jun. 23–27, 1996.

Digital Communications, J. G. Proakis, Convergence Properties of the LMS Algorithm, pp. 642–644, 1995.

* cited by examiner

*Primary Examiner*—Stephen Chin
*Assistant Examiner*—Dac V. Ha
(74) *Attorney, Agent, or Firm*—Stallman & Pollock LLP

(57) ABSTRACT

A method of calculating TEQ and FEQ coefficients in a discrete multi-tone (DMT) system includes determining an estimated channel impulse response. A frame delay is determined based upon the estimated channel impulse response. Using these parameters and a known training sequence, the method generates the TEQ coefficients. The method then generates the FEQ coefficients based upon the TEQ coefficients and a version of the estimated channel impulse response.

33 Claims, 7 Drawing Sheets

FIG. 5
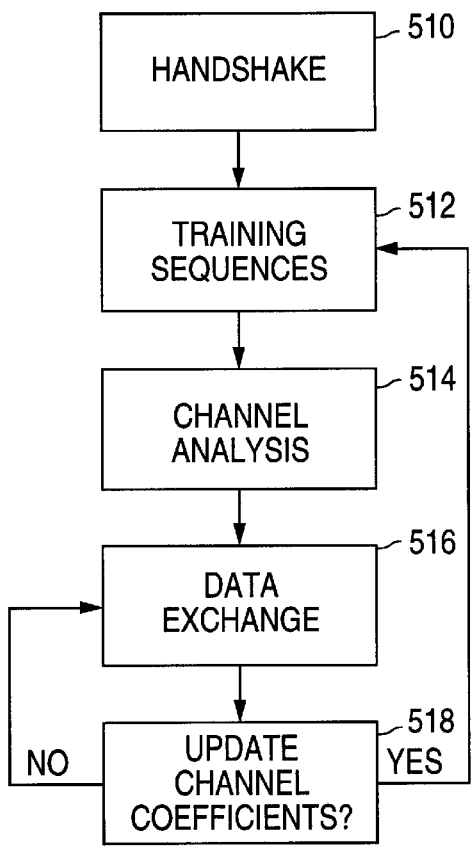
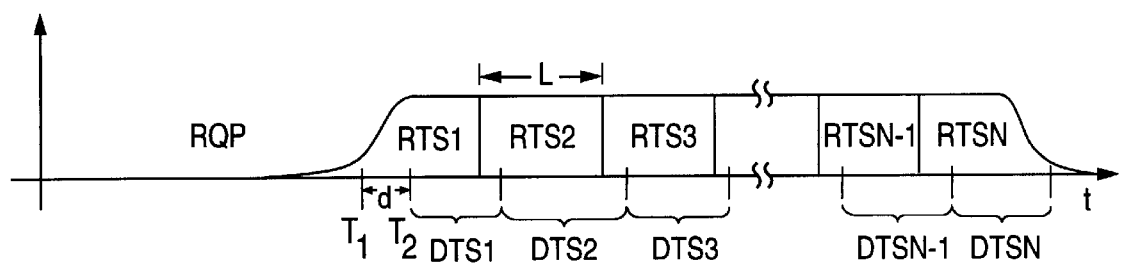
FIG. 8
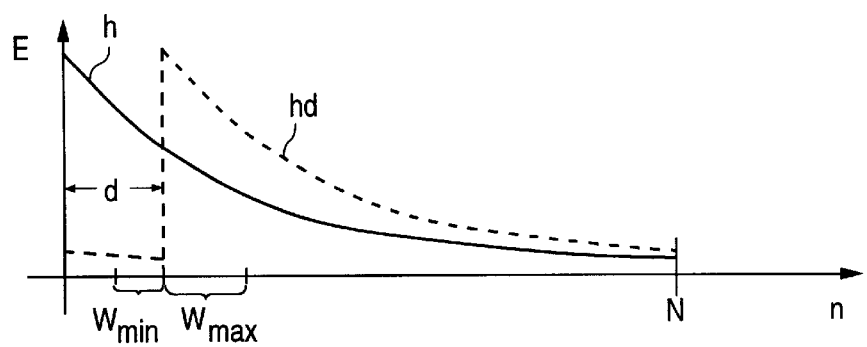
FIG. 9

METHOD FOR FAST OFF-LINE TRAINING FOR DISCRETE MULTITONE TRANSMISSIONS

FIELD OF THE INVENTION

The invention relates generally to systems for discrete multitone (DMT) transmission of data over a communication channel and more specifically to systems for training the time and frequency domain equalizer coefficients in DMT systems.

BACKGROUND OF THE INVENTION

Asymmetric digital subscriber line (ADSL) systems are used to implement broadcast digital TV, on-demand video, high-speed video-based internet access, and other forms of data transfers over existing twisted-pair telephone lines. Recently, the International Telecommunication Union published a draft recommendation for an ADSL system. See "Splitterless Asymmetric Digital Subscriber Line (ADSL) Transceivers," International Telecommunication Union, ITU-T, G.992.2, March, 1999, which is incorporated herein by reference.

To provide reliable data transfers, ADSL uses DMT technology. Methods for encoding and decoding data using DMT technology in an ADSL system are well known. See, for example, J. Gibson, The Communications Handbook, pages 450–479, IEEE Press, 1997, which is incorporated herein by reference.

Generally, a DMT system uses a number of frequencies (or carriers) to transmit data over a communication channel. A block diagram of a DMT system is shown in FIG. 1. The DMT system includes encoder 100, communication channel 110 and decoder 120. Encoder 100 receives serial data through line 102. Encoder 100 encodes the data using a DMT system. Encoder 100 then provides the encoded data through line 104 to channel 110. Typically, channel 110 includes a telephone line. After transmission through channel 110, the encoded data is provided through line 112 to decoder 120. Decoder 120 attempts to create a replica of the original serial data received by the encoder 100 through line 102. To do so, decoder 120 attempts to minimize the effects of channel 110 on the encoded data. Decoder 120 also provides the complementary coding functionality to that of encoder 100.

In many applications, a transceiver connects to each end of channel 110. The transceiver includes both an encoder and a decoder. A portion of the frequency spectrum is allocated to each transceiver. This configuration allows data transmission in both directions.

Turning to FIG. 2, encoder 100 is described in further detail. The encoder 100 includes a serial-to-parallel converter 202. Serial-to-parallel converter 202 receives the serial data through line 102 at a rate of B bits/second. Serial-to-parallel converter 202 groups the serial data into blocks of complex data having a length of N. In a typical implementation, N is 256.

Channel characteristics will vary depending upon the specific implementation. For example, two different twisted-pair telephone connections will have, in all likelihood, different characteristics. Accordingly, encoder 100 determines the frequency characteristics of the channel and attempts to determine an optimal loading distribution. One method of determining a loading distribution is described in U.S. Pat. No. 5,479,447, "Method and Apparatus for Adaptive, Variable Bandwidth, High-Speed Data Transmission of a Multicarrier Signal over Digital Subscriber Lines," P. Chow et al., Dec. 26, 1995, which is incorporated herein by reference. Serial-to-parallel converter 202 distributes the serial data according to the loading distribution. The resulting parallel data, $X_{0,k}, X_{1,k}, \ldots X_{N-1,k}$ (where k denotes the block number), is provided over lines 204 to inverse fast Fourier transform (IFFT) 206.

The IFFT 206 transforms the parallel data from the frequency domain into the time domain. As shown, IFFT 206 is 2N long. This transformation distributes the information contained in each element of the parallel data across the transformed data, $X_{0,k}, X_{1,k}, \ldots X_{2N-1,k}$.

The transformed data, $X_{0,k}, X_{1,k}, \ldots X_{2N-1,k}$, is provided over lines 208 to cyclic prefix adder 210. Cyclic prefix adder 210 attaches a cyclic prefix, $X_{2N-1,k}, X_{2N-2,k}, \ldots X_{2N-v,k}$, to each block of data. The FFT sub-channel outputs do not interfere with one another if the cyclic prefix is longer in length than the impulse response of the channel. In practical applications, the impulse response of the channel (e.g., a twisted pair) is infinite in length. As will be described, further below, time-domain equalization (TEQ) is applied by a decoder to reduce the effects of the channel to a substantially finite duration. The cyclic prefix, $X_{2N-1,k}, X_{2N-2,k}, \ldots X_{2N-v,k}$, is chosen so that it exceeds this finite duration. Together the TEQ and the cyclic prefix operated to minimize the effect of the channel on the transmitted data.

Cyclic prefix adder 210 provides the prefixed and transformed data, $X_{2N-v,k}, \ldots X_{2N-2,k}, X_{2N-1,k}, X_{0,k}, X_{1,k}, \ldots X_{2N-1,k}$, through lines 212 to parallel-to-serial converter 214. Parallel-to-serial converter 214 converts this data to a serial format and provides the resulting bit stream, x(t), through line 216 to digital-to-analog converter 218. Digital-to-analog converter 218 provides the resulting analog signal through line 220 to low-pass filter 222. Low-pass filter 222 removes high-frequency noise resulting from the conversion and provides the resulting signal through line 226 to isolation transformer 226. The output of isolation transformer 226 connects to the communication channel 110 (shown in FIG. 1) through line 104.

Turning to FIG. 3, a block diagram showing a model of communication channel 110 is described. Communication channel 110 is a digital subscriber line (DSL) or like medium suitable for exchanging data. As shown, communication channel 110 is modeled as a filter having an impulse response, h(t), with an additive noise component, n(t). According to this model, filter 302 convolves x(t) with h(t). In the frequency domain, h(t) corresponds to H(ω). The result is provided to adder 306. Adder 306 also receives noise component, n(t), from channel noise generator 304. Therefore, passing x(t) through communication channel 110 produces x(t)*h(t)+n(t), where "*" denotes the operation of convolution. The resulting signal, y(t), is provided to decoder 120 (shown in FIG. 1) through line 112.

Turning to FIG. 4, decoder 120 is shown in further detail. The received signal, y(t), is passed though transformer 410, which acts to isolate any D.C. components. The received signal is then provided through line 412 to low-pass filter 414. Low-pass filter 414 removes high-frequency noise. The signal is then provided through line 416 to analog-to-digital converter 418 where it is converted to a digital signal. The received signal is then provided through line 420 to time-domain equalizer 422. Time-domain equalizer 412 includes a finite-impulse-response (FIR) filter that limits the effective memory of channel 110. The signal is then passed over line 424 to serial-to-parallel converter 426. Serial-to-parallel converter passes the resulting parallel data, $y_{2N-v,k}, \ldots$ $y_{2N-2,k}, y_{2N-1,k}, y_{0,k}, y_{1,k} \ldots y_{2N-1,k}$, over lines 428 to cyclic prefix stripper 430. The resulting signal, $y_{0,k}, y_{1,k}, y_{2N-1,k}$, is provided over lines 432 to fast Fourier transform (FFT) 434. The signal provided to FFT 144 is 2N wide and is transformed from a time domain representation to a frequency domain representation. Since the amplitude vs. frequency and the delay vs. frequency responses of the channel are not necessarily constant across the frequency band, the received signal, $Y_{0,k}, Y_{1,k}, \ldots Y_{N-1,k}$, will differ from the encoded signal $X_{0,k}, X_{1,k}, \ldots X_{N-1,k}$. Frequency domain equalizer (FEQ) 438 provides a simple form of compensation for these differences. The FEQ 438 individually adjusts the attenuation and delay of each of the carriers.

The FEQ 438 passes the resulting signals, $Z_{0,k}, Z_{1,k}, \ldots Z_{2N-1,k}$, through lines 440 to parallel-to-serial converter 442. Parallel-to-serial converter passes the resulting signal out through line 122. If the encoding, transmission, and decoding processes work properly, the signal passed through line 122 will match the signal received through line 102 (shown in FIG. 1).

As mentioned above, the channel 110 often includes a twisted-pair telephone connection. Due to the dispersive nature of such channels, severe channel attenuation as well as intersymbol interference (ISI) are unavoidable. The TEQ and FEQ coefficients are used to mitigate the effects of channel attenuation and ISI. Since the channel characteristics vary, the TEQ and the FEQ must be optimized on a channel-by-channel basis.

Various methods for generating the TEQ and FEQ coefficients are known in the art. For example, U.S. Pat. No. 5,285,474, "Method for Equalizing a Multicarrier Signal in a Multicarrier Communication System," J. Chow et al., Feb. 8, 1994, which is incorporated herein by reference, teaches a method for optimizing a set of equalization parameters used in a DMT system. This method initializes the equalization parameters, then repeatedly sends a training sequence through the communication channel to the receiver (or decoder). Using the equalization parameters, the received sequence, and a local replica of the training sequence, the receiver updates a set of channel target response parameters. The receiver also windows the channel target response parameters as well as the equalizer parameters. The training process is repeated until a predetermined condition is met.

Although the method taught by U.S. Pat. No. 5,285,474 provides effective optimization of the equalization parameters, this method suffers from a low rate of convergence. In addition, for a training frame having 512 samples, this method requires approximately 40,000 multiplications. This requires significant computational power in practical applications. In addition, the signal-to-interference ratio (SIR) resulting from the method is not optimal.

Another method is taught by U.S. Pat. No. 5,627,863, "Frame Synchronization in Multicarrier Transmission Systems," J. Aslanis et al., May 6, 1997, which is incorporated herein by reference. Specifically, this method performs frame synchronization using correlation of frequency domain amplitudes of received synchronizing frame and stored synchronizing patterns. This method is best suited for frame synchronization during a data transmission phase, where a synchronizing frame is inserted into the data carrying frames. Using this method during the training session can require setting the time and frequency equalizer coefficients prior to the frame synchronization (see e.g., column 11, lines 41–62 of U.S. Pat. No. 5,627,863). Using an unsynchronized frame for setting the equalizer may result in a sub-optimal solution. Furthermore, this frame synchronization requires a considerable number of calculations to calculate the frame alignment.

Yet another method of generating the TEQ coefficients is taught by "Time-Domain Equalizer Training for ADSL," M. Nafie et al., IEEE International Conference on Communication, June 1997, which is incorporated herein by reference. Specifically, this method teaches off-line training techniques for generating the TEQ coefficients. The off-line training techniques include both a minimum eigenvalue approach and a time-domain LMS approach. The time-domain LMS approach requires an initial estimate of the channel impulse response. Unfortunately, under certain circumstances, this approach may generate a low-pass or zero solution for the TEQ coefficients. In addition, for a training frame having 512 samples, this approach requires approximately 30,000 multiplications. This requires significant computational power in practical applications.

Accordingly, an improved method of generating the TEQ and FEQ coefficients is desired which requires few computational resources. To this end, the method should attempt to minimize the number of comparisons required to select the correct frame alignment. In addition, the method should provide a high convergence rate. Finally, the method should provide an improved SIR.

SUMMARY OF THE INVENTION

In one preferred embodiment of the invention, a decoder in a DMT system detects a plurality of training sequences received via a channel. The decoder calculates an estimated channel impulse response for the channel based upon the detected plurality of training sequences and a transmitted training sequence. The estimated channel impulse response includes a circular shift. The decoder determines a frame delay based upon the circular shift.

In another preferred embodiment of the invention, a method of generating TEQ and FEQ coefficients in a DMT system detects a plurality of sequences received through a channel. The method averages the detected plurality of sequences to provide an averaged sequence. The method determines an estimated channel impulse response for the channel based upon the averaged sequence. The method determines a frame delay based upon the estimated channel impulse response. The method calculates TEQ coefficients based upon the estimated channel impulse response and a desired channel impulse response. The method calculates FEQ coefficients based upon the calculated TEQ coefficients.

In another preferred embodiment of the invention, a decoder generates TEQ and FEQ coefficients in a DMT system. The decoder includes an analog-to-digital converter, a digital signal processor, and a controller. The analog-to-digital converter is configured to receive an analog signal through a channel and convert the analog signal into a digital signal. The decoder includes a digital signal processor operationally coupled with the analog-to-digital converter and configured to receive the digital signal. The controller is operationally coupled with the digital signal processor and configured to provide commands to the digital signal processor. The commands include instructions directing the digital signal processor to detect a change in energy level of the digital signal. The change in energy level identifies the start of a plurality of received training sequences. The commands also include instructions directing the digital signal processor to calculate an average of the plurality of received training sequences. The commands also include instructions directing the digital signal processor to calculate an estimated channel impulse response based upon the average of the plurality of received training sequences. The commands also include instructions directing the digital signal processor to calculate a frame delay based upon the estimated channel impulse response. The commands also include instructions directing the digital signal processor to calculate TEQ coefficients based upon the estimated channel impulse response and a desired channel impulse response. The commands also include instructions directing the digital signal processor to calculate FEQ coefficients based upon the TEQ coefficients.

BRIEF DESCRIPTION OF THE DRAWINGS

FIG. 5 is a flow chart showing one preferred method of transmitting data via a DMT system.

FIG. 8 is a graph showing a signal, including training sequences, received through a channel.

FIG. 9 is a graph showing a channel impulse response, h, and a delayed channel impulse response.

DETAILED DESCRIPTION OF THE INVENTION

Figure 1:
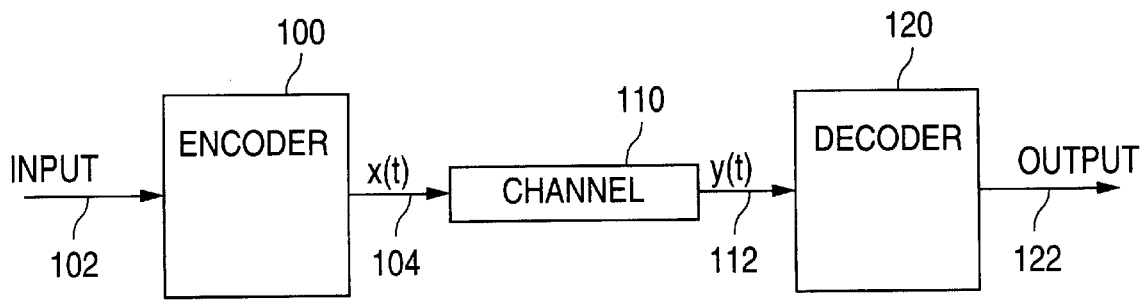
FIG. 1 is a block diagram of a prior art DMT system including an encoder 100, a channel 110, and a decoder 120.
Figure 3:
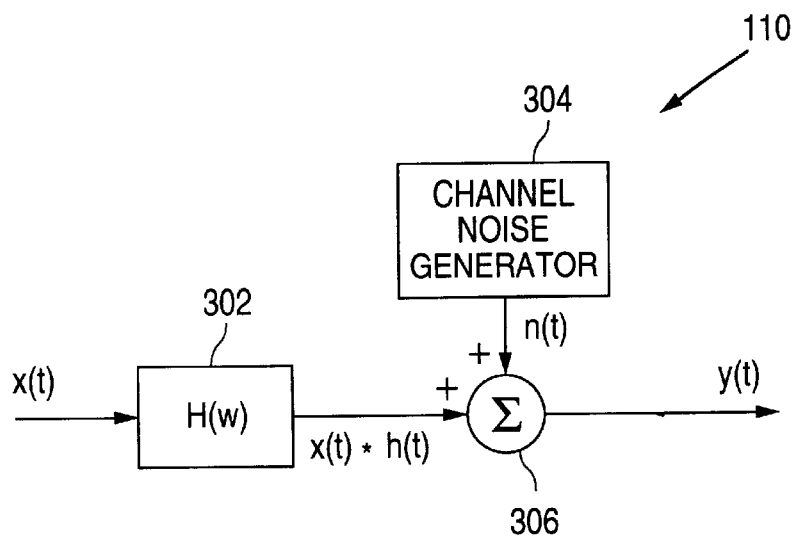
FIG. 3 is a block diagram of a model of the channel 110 shown in FIG. 1.

Turning to FIG. 5, a flow chart showing one preferred method of transmitting data over a DMT system is shown. In one preferred embodiment, the following operations are performed using the encoder 100, channel 110, and decoder 120 shown in FIGS. 1–4. The operations can, of course, be performed using other systems known in the art.

Beginning at block 510, encoder 100 and decoder 120 perform a handshaking procedure. This establishes the maximum data exchange rate between the two devices.

Next, at block 512, encoder 100 transmits a plurality of training sequences. A graph showing the transmission of such training sequences is described with reference to FIG. 6. The transmission of the training sequences begins with a quiet period, QP. During QP, encoder 100 provides a zero-level output to channel 110. After QP, encoder 100 provides a training sequence, TS1, to channel 110. The level of TS1 shown in FIG. 6 identifies an averaged energy level of this signal. In one preferred embodiment, the actual values of TS1 are generated based upon a pseudo-random number algorithm. Encoder 100 converts this sequence of pseudo-random numbers into an analog signal, which is transmitted over channel 100 as TS1.

Figure 6:
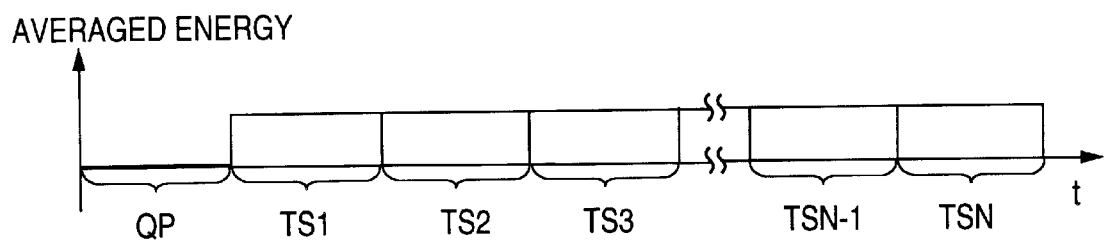
FIG. 6 is a graph showing one preferred signal used to transmit training sequences through a channel.
Figure 2:
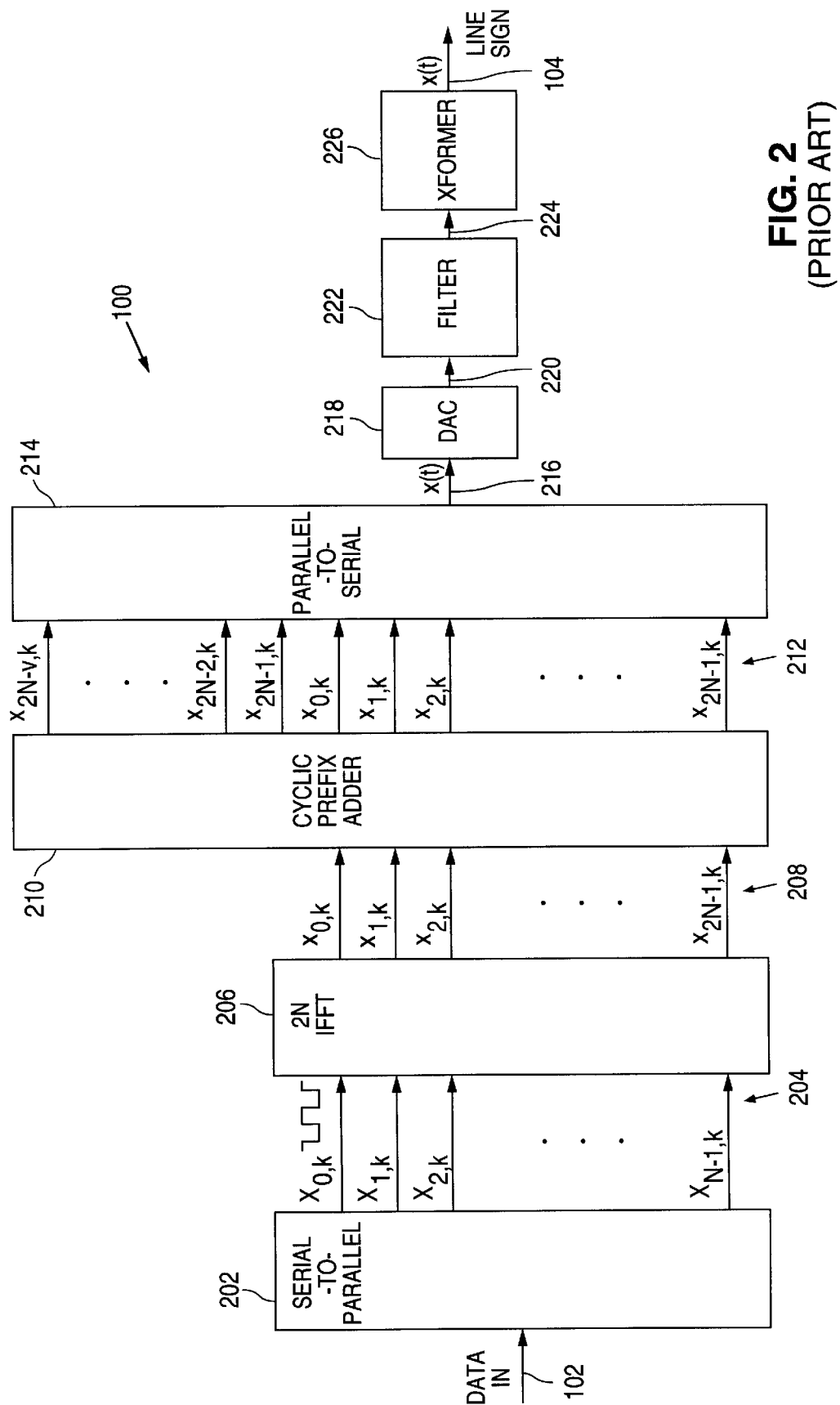
FIG. 2 is a block diagram of the encoder 100 shown in FIG. 1.
Figure 4:
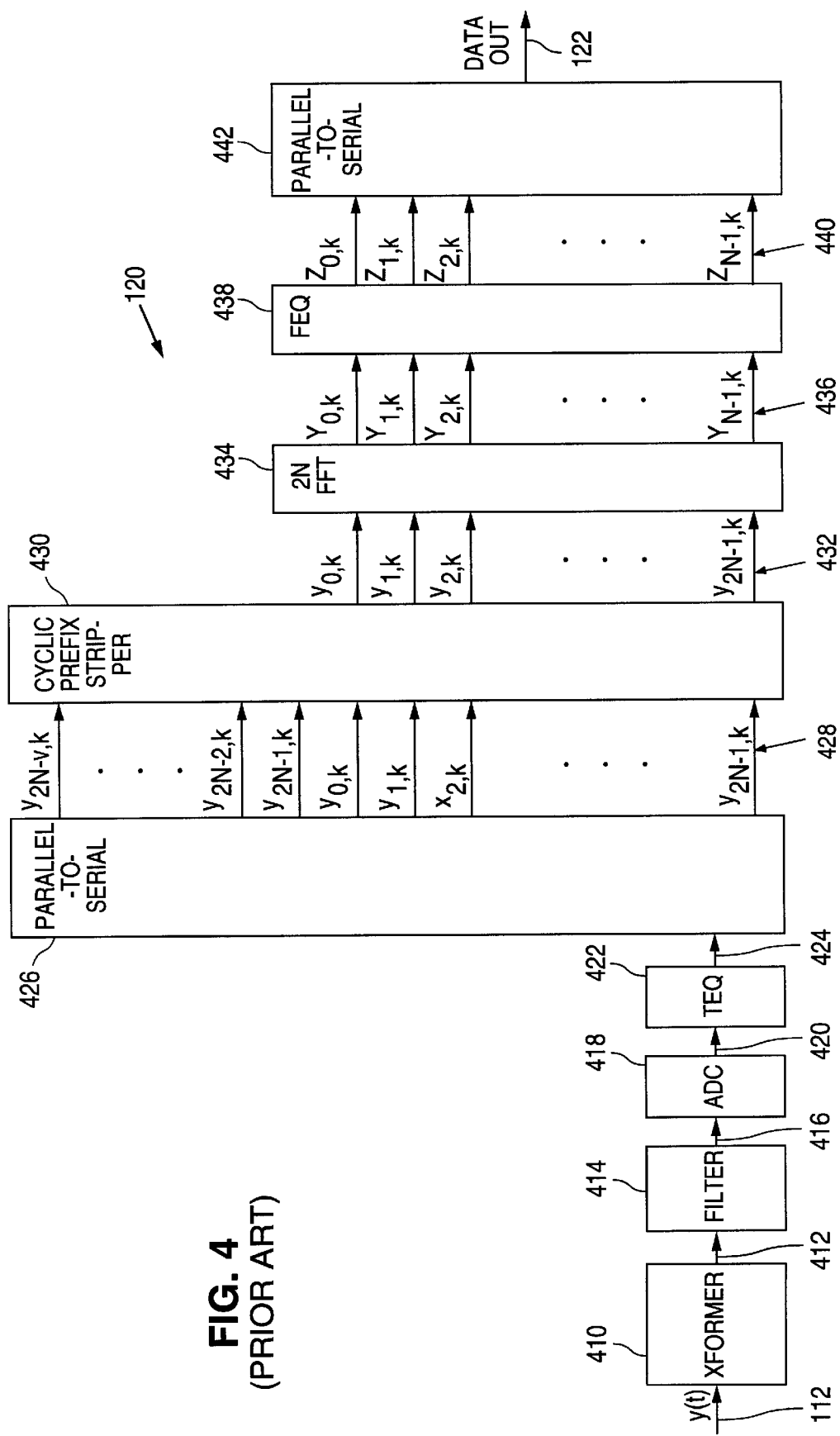
FIG. 4 is a block diagram of the decoder 120 shown in FIG. 1.

Another training sequence, TS2, follows the transmission of TS1. Encoder 100 uses the same values used to generate TS1 to generate TS2. Encoder 100 continues to provide training sequences identical to TS1 until decoder 120 has enough data to generate a model of channel 110. If channel 110 is a noisy channel, receiver 130 will require more training sequences to generate an accurate model; if channel 110 is a clear channel, receiver 130 will require fewer training sequences to generate an accurate model. Although only one quiet period, QP, and only one frame of training sequences, TS1, TS2 . . . TSN, are shown in FIG. 6, encoder 100 may transmit multiple quite periods followed by multiple frames of training sequences.

Returning to FIG. 5, after the transmission of the training sequences is complete, decoder 120 proceeds to block 514. Here, decoder 120 generates a model of channel 110. The model includes TEQ and FEQ coefficients as well as a loading distribution. As mentioned above, U.S. Pat. No. 5,479,447 describes one method of determining the loading distribution. Next, at block 516, encoder 100 transmits data through channel 110 based upon the determined loading distribution. Decoder 120 receives the data and, using the TEQ and FEQ coefficients, decodes the data.

In some applications, the channel properties will change over time. Accordingly, in one preferred embodiment, the TEQ and FEQ coefficients are updated based upon such changes. At block 518, decoder 120 determines whether the channel coefficients should be updated. If so, encoder 100 transmits additional training sequences through channel 110. Based upon the received training sequences, decoder 120 updates the TEQ and FEQ coefficients. As mentioned above, one method for updating the TEQ and FEQ coefficients is described in U.S. Pat. No. 5,285,474.

Figure 7:
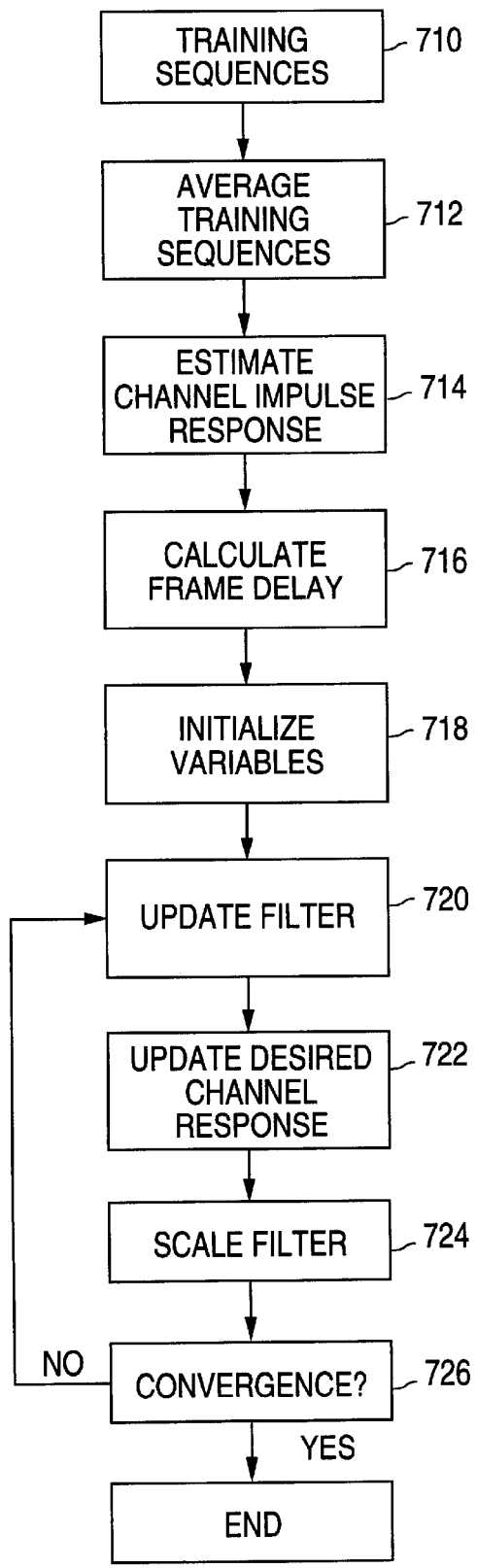
FIG. 7 is a flow chart showing one preferred method of generating TEQ coefficients.

Turning to FIG. 7, a flow chart showing one preferred method of generating TEQ coefficients is described. The process begins at block 710 where a series of training sequences are transmitted by encoder 100 through channel 110. The first training sequence is sent after a quiet period.

Decoder 120 monitors for a change in signal energy. This process is described with reference to FIG. 8. As shown, decoder 120 first receives a quiet period, RQP. The received quiet period, RQP, is followed by a series of training sequences, RTS1, RTS2, RTS3 . . . RTSN. The first received training sequence, RTS1, begins at time $T_1$. However, due to channel effects, the energy level of the first received training sequence increases gradually over time. As a result, decoder 120 does not detect the start of the first training sequence until time $T_2$. The amount of time between $T_1$, and $T_2$ is the frame delay, d. Each of the detected training sequences, DTS1, DTS2, DTS3 . . . DTSN, are shifted with respect to the received training sequences, RTS1, RTS2, RTS3 . . . RTSN, by the frame delay, d.

For noisy channels, decoder 120 may detect the start of the first training sequence by monitoring for a change in energy over a number of samples. This helps to avoid the spurious detection of noise spikes on the received signal.

Each training sequence (both received and detected) is L bits long. As a result, the first detected training sequence, DTS1, includes the last L-d bits of the first received training sequence, RTS1, and the first d bits of the second received training sequence, RTS2. Similarly, with the exception of the last detected training sequence, DTSN, each subsequent detected training sequence includes the last L-d bits of the corresponding received training sequence and the first d bits of the next received training sequence.

As mentioned above, the transmitted training sequences are identical. Ideally, each of the received training sequences should likewise be identical. As shown, however, the first received training sequence, RTS1, and the last received training sequence, RTSN, may experience transient channel effects.

These effects are shown in FIG. 8 by the gradual sloping in the received signal at the start of the first received training sequence, RTS1, and at the end of the last received training sequence RTSN. In addition, according to the model shown in FIG. 2, each of the received signals will include a noise component. If this noise component is ignored, the received training sequences, RTS2, RTS3 . . . RTSN1, should be identical. As a result, the detected training sequences DTS2, DTS3 . . . DTSN1 are simply a circularly shifted version of the corresponding received training sequence where the elements are shifted by d. For example, if RTS2 is circularly shifted by d, it is equal to DTS2.

Returning to FIG. 7, after decoder 120 receives the training sequences at block 710, the process proceeds to block 712. Here, decoder 120 averages the detected training sequences, DTS2, DTS3 ... DTSN1. As mentioned above, each of the detected training sequences are the same except for a noise component. Consequently, the average will gradually converge to a stable value. When the average has converged to a stable value, decoder 120 transmits a stop signal through channel 110 to encoder 100. The stop signal alerts the encoder 100 that the decoder 120 has enough data to generate a model of the channel 110. Since encoder 100 will continue to transmit data until it receives the stop signal, decoder must perform the averaging during or in between transmissions. These calculations are on-line calculations.

In an alternative embodiment, encoder 100 transmits a fixed number of training sequences. The fixed number of training sequences is sufficient to ensure that decoder 120 can generate an accurate model of channel 110. Decoder 120 uses the received training sequences to generate an average. Since decoder 120 does not need to generate a stop signal, the calculation may be performed off-line.

After generating an average of the received training sequences, decoder 100 then estimates the channel-impulse response at block 714. For the purpose of the following analysis, x is the transmitted training sequence of length N. The transmitted training sequence, x[n], is a pseudo-random noise signal having the properties shown below. The "$\otimes$" denotes circular correlation, "mod" denotes modulo (i.e., the remainder of a division), and "·" denotes multiplication.

$$x[n+1] \otimes x[n] = \Sigma\, x[(n+1)\bmod N]\cdot[n],$$

where the summation is performed from n=0 through N−1;

$$=\sigma^2\, x\cdot\delta[1]+e[n],$$

where "$\sigma^2\, x$" denotes the variance of x, $\delta[n]$ is a delta function having a value of one at n=0 and zero everywhere else, and e[n] is an error signal.

Ideally, the error signal e[n] is zero for all n. However, for finite-duration pseudo-random signals, e[n] is generally non-zero. Nonetheless, it can be neglected provided $\sigma^2\, x$ is much greater than e[n]. Under this condition:

$$x[n+1]\otimes x[n]=\sigma^2\, x\cdot\delta[1].$$

As described above in relation to FIG. 3, the transmission of the training sequence, x, through channel 110 produces a signal, y. According to the channel model, y is convolved with the channel impulse response, h. In addition, y includes an additive noise component, n.

Again, at block 712, a number of detected training sequences are averaged. For the purpose of the following analysis, this average is $y_{avg}$. Since the averaging is not terminated until $y_{avg}$ converges to a stable value, the additive noise component, n, can be neglected. Accordingly:

$$y_{avg}=x*hd,$$

where the "*" denotes the operation of convolution and "hd" denotes the channel response including the above-described frame delay.

Therefore, performing a circular correlation between x and $y_{avg}$ will yield an estimate of the channel impulse response, hd. More specifically:

$$\begin{aligned}
x\otimes y_{avg} &= x\otimes(x*hd);\\
&=(x\otimes x)*hd;\\
&=\sigma_x\cdot\delta*hd;\\
&=\sigma_x\cdot hd.
\end{aligned}$$

Accordingly, decoder 120 circularly convolves the transmitted training sequence, x, with an average of the detected training sequence, $y_{avg}$, to provide a scaled estimate of the channel impulse response, hd. The scaling factor is $\sigma_x$. The channel impulse response, hd, includes the above-described frame delay. Accordingly, hd is also referred to as the delayed channel impulse response.

At block 716, decoder 120 calculates the frame delay, d. As mentioned above, the frame delay is the amount of time from the start of a received training sequence to the start of the detected training sequence. If the channel did not affect the data, the frame delay would be equal zero (excluding any cyclic prefix).

The process of finding the frame delay involves finding the start of the channel impulse response without the inclusion of the frame delay. The time from the start of the delayed channel impulse response to start of the channel impulse response is equal to the frame delay. Since the amplitude of the channel impulse response is generally a monotonically decreasing function., the start of the channel impulse response can be found by finding a minimum energy window within the delayed channel impulse response. The last sample of the minimum energy window is the last sample of the channel impulse response. The next sample is generally the first sample of the channel impulse response. The channel impulse response, h, is then found from the delayed channel impulse response by circularly shifting the delayed channel impulse response d samples. The processes for performing these calculations are further described below with reference to FIGS. 9–11.

After determining the channel impulse response, decoder 120 proceeds to calculate the TEQ coefficients. This process is described with reference to blocks 718–726. As mentioned above, the TEQ coefficients are used to prevent inter-symbol interference in channels with a long impulse response. The TEQ coefficients shorten the channel impulse response to be equal to or less than the cyclic prefix of length P.

The problem of finding the TEQ coefficients involves finding:

$$\min_w E\{(h*w-b)^2\},$$

where h is the estimated channel impulse response and an N×1 vector, w is the time domain FIR filter and an L×1 vector, and b is the desired channel response at the TEQ output and an N×1 vector. E{ } denotes the expected value. Also, the convolution of h with w produces a vector of length N+L. Since b is only a vector of length N, h*w is truncated by eliminating the last L samples. This allows minimization to occur for at least the cyclic prefix length.

To calculate this minimization, the receiver initializes b at block 718. The first P coefficients of b, b[1:P], are set equal to h[1:P]. In addition, b[P+1:N] are set equal to zero. At block 718, receiver 120 also initializes w. The first L−1 coefficients of w, w[1:L−1], are set equal to zero. In addition, w[L] is set equal to one. At block 718, receiver 120 also initializes u. The first L− I coefficients of u, u[1:L−1], are set equal to zero. In addition, u[L:N+L−1] are set equal to h[1:N].

At block 720, decoder 120 generates an updated estimate of w using the well-known least-mean-square (LMS) algorithm. Specifically, the updated estimate of w is determined using the following loop:

for n=1 through N, $$u_{n}=u[n:n+L-1]$$

$$W_{n+1}=W_n+\mu \cdot u_n \cdot (b[n]-u_n^T \cdot w_n).$$

The "T" denotes the operation of transposition. The step size, $\mu$, is a constant that determines the update rate. In one preferred embodiment, $\mu$ is initially set to a relatively high value and decreased as the process approaches an optimal solution. This allows the process to take large steps toward the optimal solution at the beginning. As the optimal solution is approached, the smaller steps provide greater accuracy. In addition, the smaller steps help prevent overshooting the optimal solution. Further details of an LMS are described in "Adaptive Filter Theory," $2^{nd}$ Ed., S. Haykin, pages 299–369, Prentice Hall, Englewood Cliffs, N.J., 1991, which is incorporated herein by reference.

Next, at block 722, decoder 120 updates the desired channel response using the following formula:

$$b[n]=\Sigma(b[k] \cdot w[n-k]),$$

where the summation is performed from k =1 through P.

At block 724, decoder 120 scales w so that the energy of b is equal to the energy of h. This is accomplished according to the following formula:

$$w=w \cdot (\Sigma h[i]^2)/(\Sigma b[j]^2),$$

where the summation in the numerator is performed from i=1 through P, and the summation in the denominator is performed from j =1 through N.

At block 726, decoder 120 tests for convergence. Specifically, the current value of w is compared to the previous value of w. If the current value of w is approximately the same as the previous value of w, then the process of generating the TEQ coefficients is complete. In other words, the iterative process has converged toward the optimal solution. Otherwise, the process returns to block 720.

In another preferred embodiment, decoder 120 estimates the channel impulse response before the average of the training sequences has converged to a stable value. This allows decoder 120 to proceed with the calculation of the TEQ coefficients. After the average of the training sequences converge to a stable value, decoder 120 re-estimates the channel impulse response. The TEQ coefficients are also updated by re-initiating u (at block 718). The filter coefficiences are then updated based upon the updated channel impulse response. This reduces the total amount of time required to calculate the TEQ coefficients because an initial estimate is made without waiting for the average of the training sequence to converge.

Turning to FIG. 9, the process of finding the frame delay is described in more detail. Specifically, the amplitude of the impulse response of channel 110, h, is shown by the solid line. The amplitude of the delayed channel impulse response, hd, is shown by the dashed line. In practical applications, the amplitude of the impulse response is a monotonically decreasing function. The delayed channel impulse response, hd, is identical to the channel impulse response, except that it has been circularly shifted by the frame delay, d. As a result, the frame delay, d, can be found simply by finding a minimum energy window, $W_{min}$, of the delayed channel impulse response.

Figure 10:
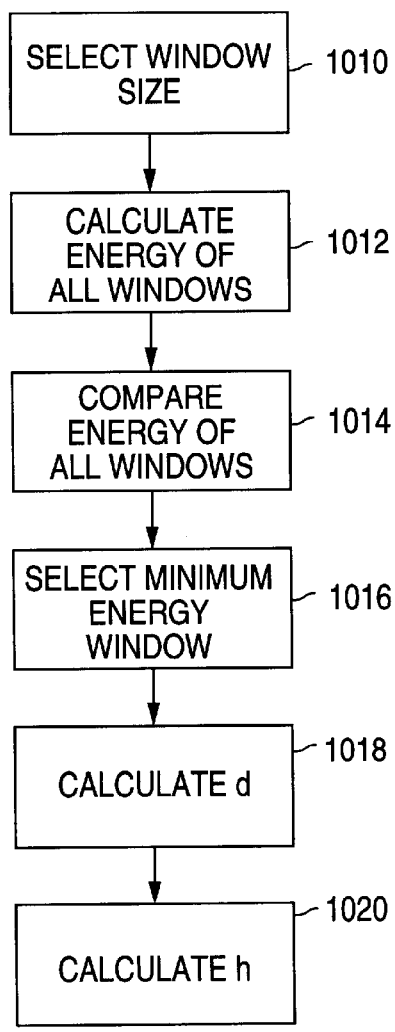
FIG. 10 is a flow chart showing one preferred method of finding a frame delay based upon the delayed channel impulse response of FIG. 9.
Figure 11:
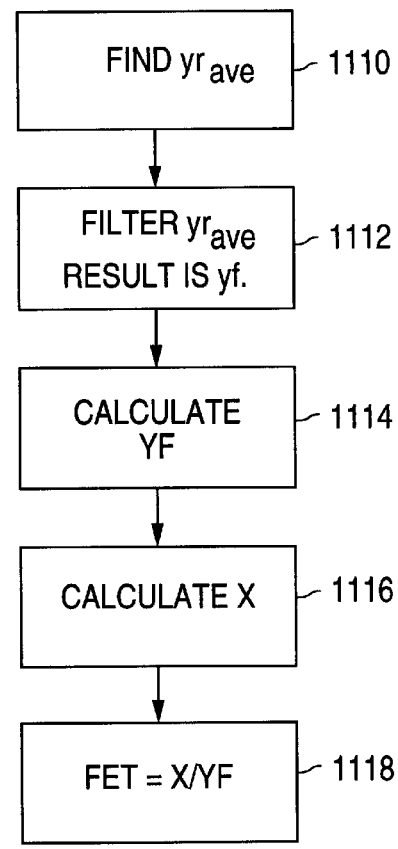
FIG. 11 is a flow chart showing one preferred method of generating FEQ coefficients.

Turning to FIG. 10, one preferred method for finding the delay, d, and the channel impulse response, h, is described. Beginning at block 1010, decoder 120 sets a window length, $L_w$, equal to the length of the cyclic prefix. At block 1012, decoder 120 calculates the energy of all possible windows. Specifically, decoder 120 performs the following calculations:

for n=1 through N:

$$E_{wn}=\Sigma hd[k \bmod N]^2$$

where the summation is performed from k=n through n+$L_w$.

At block 1014, decoder 120 compares the energy of all windows. At block 1016, the window having the smallest $E_{wn}$, is selected. This is the minimum energy window. Returning to FIG. 9, the minimum energy window is identified as $W_{min}$. As shown, the amount of time to the last sample of $W_{min}$ is equal to the frame delay. Accordingly, at block 1018, d is simply set equal to $n_{min}+L_w$.

In some applications, the estimate of the channel impulse response will include a significant noise component. For example, if the averaging session terminates before convergence, then the channel impulse response will include a significant noise component. In such applications, one preferred embodiment finds the first sample subsequent to the minimum energy window with energy larger than a threshold energy level. This sample is the first sample of the channel impulse response, h. The delay, d, is simply the amount of time to the first sample of the channel impulse response, h.

Returning to FIG. 10, at block 1020, decoder 120 calculates the channel impulse response, h. Specifically, decoder 120 circularly shifts the delayed impulse response, hd, d places to the left. This provides the channel impulse response, h. Equivalently:

$$h[1:N]=hd[d+1, d+2, \ldots N, 1, 2, \ldots d].$$

Although the process of finding the frame delay has been described using a minimum energy window, the delay may also be found using maximum energy window, $W_{max}$. The maximum energy window, $W_{max}$, is shown in FIG. 9. If $n_{max}$ is the first sample in the maximum energy window, $W_{max}$, then the frame delay is equal to $n_{max}-1$.

As mentioned above, the frame delay is found during the calculation of the TEQ coefficients. Specifically, as shown in FIG. 7, decoder 120 calculates the frame delay at block 716. Decoder 120 then calculates the TEQ coefficients. This process was described above with reference to blocks 718–726. Based upon simulations, the above-described process achieves faster convergence than the process described in the aforementioned "Time Domain Equalizer Training for ADSL," IEEE International Conference on Communication, June 1997. In addition, the above-described process ensures that the energy of the channel impulse response will be transferred to the first P elements of b. This avoids low-pass or zero solutions for w. Under certain circumstances, the process described in "Time Domain Equalizer Training for ADSL" will not avoid such solutions.

After calculating the TEQ coefficients, decoder 120 calculates the FEQ coefficients. One preferred process is now described with reference to FIG. 11.

Beginning at block 1110, decoder 120 circularly shifts the average training data, $y_{avg}$, d places to the left. This provides a shifted version of the averaged signal, $yr_{avg}$.

Next, at block 1112, decoder 120 circularly convolves $yr_{avg}$ with the TEQ filter coefficients, w, to produce a filtered version of the signal, yf. Then, at block 1114, decoder 120 applies an FFT to yf. The result, YF, provides a frequency domain representation of the filtered signal. At block 1116, decoder 120 applies an FFT to the known training sequence to generate X. Accordingly, X provides a frequency domain version of the training sequence. At block 1118, decoder 120 divides X by YF. This division provides the FEQ coefficients. These FEQ coefficients are used to provide a one-tap filter for equalizing received signals in the frequency domain.

Figure 12:
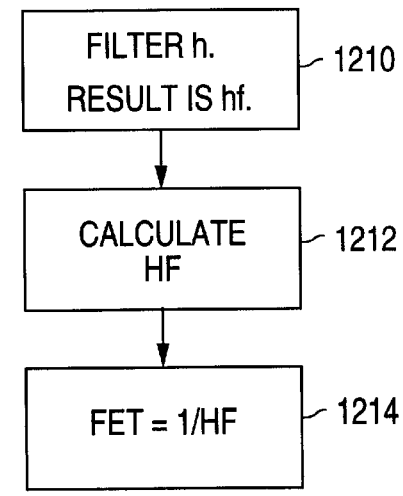
FIG. 12 is a flow chart showing another preferred method of generating FEQ coefficients.

Another preferred process for generating the TEQ coefficients is now described with reference to FIG. 12. Beginning at block 1210, decoder 120 calculates the overall channel impulse response, hf, by circularly convolving the channel impulse response, h, with the TEQ coefficients, w. Next, at block 1212, decoder 120 applies an FFT to hf. The result, HF, provides a frequency domain representation of the overall channel impulse response. At block 1214, the FEQ coefficients are generated simply by taking the inverse of the coefficients of HF.

After both the TEQ and FEQ coefficients are calculated, the channel loading is determined. Again, U.S. Pat. No. 5,479,447 teaches one preferred method for calculating the loading distribution.

The above-described process of generating the TEQ and FEQ coefficients at the initialization of a channel may be used in conjunction with various processes for updating the TEQ and FEQ coefficients. Where the channel characteristics change over time, such updating is required to avoid data loss. Again, U.S. Pat. No. 5,627,863 teaches one preferred method for updating the TEQ and FEQ coefficients.

Figure 13:
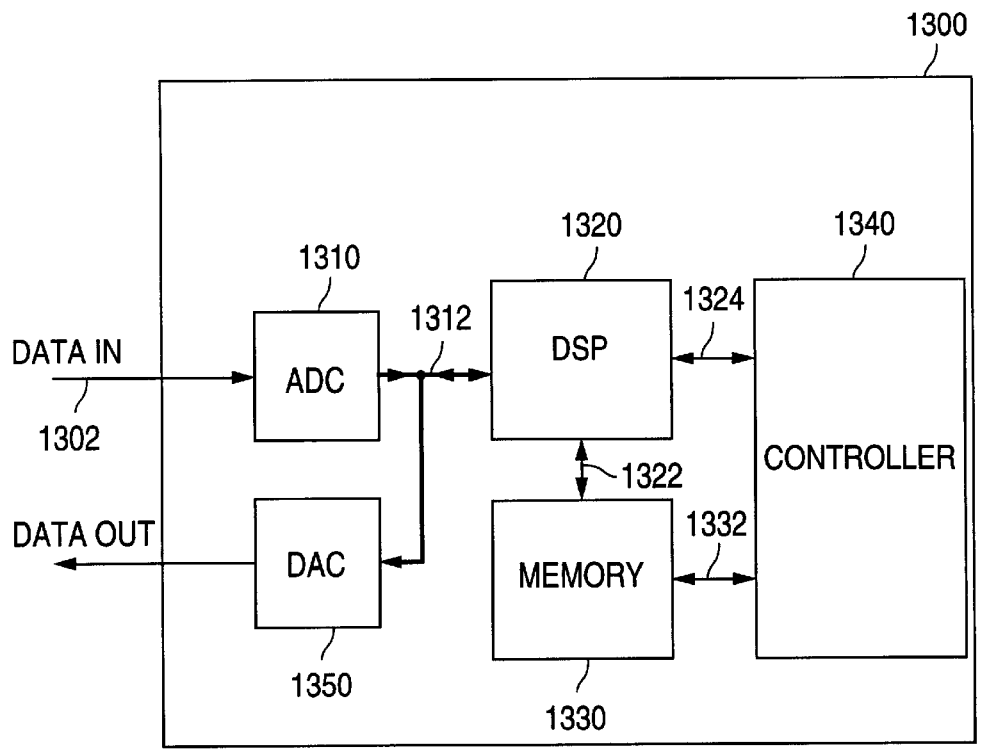
FIG. 13 is a block diagram of one preferred embodiment of a transceiver suitable for generating the TEQ and FEQ coefficients according to the methods shown in FIGS. 7, 11 and 12.

Turning to FIG. 13, a transceiver 1300 suitable for implementing the above-described functionality is described. Specifically, transceiver 1300 includes an analog-to-digital converter (ADC) 1310. Analog data is received from a channel over line 1302 and provided to ADC 1310. The ADC converts this analog data into a digital signal and provides the digital signal through bus 1312 to digital signal processor (DSP) 1320. The DSP 1320, saves the received data into memory 1322. Specifically, the DSP provides the received data over bus 1322 to memory 1330.

Controller 1340 connects to DSP 1320 over bus 1324 and to memory 1330 over bus 1332. Controller 1340 provides commands to DSP 1320 and to memory 1330 over busses 1324 and 1332, respectively. The commands include one or more machine instructions. In response to such commands, DSP 1320 calculates the TEQ and FEQ coefficients according to the above-described processes. In addition, controller 1340 may provide commands to DSP 1320 for calculating channel loading and for calculating updates to the TEQ and FEQ coefficients.

In addition, transceiver 1300 includes a digital-to-analog convertor (DAC) 1350. Data is provided by DSP 1320 to DAC 1350 over bus 1312. This allows transceiver 1300 to send data over a channel. Since transceiver 1300 includes both transmitting and receiving capabilities, it may function as a decoder, as a transmitter, or as both.

Figure 14:
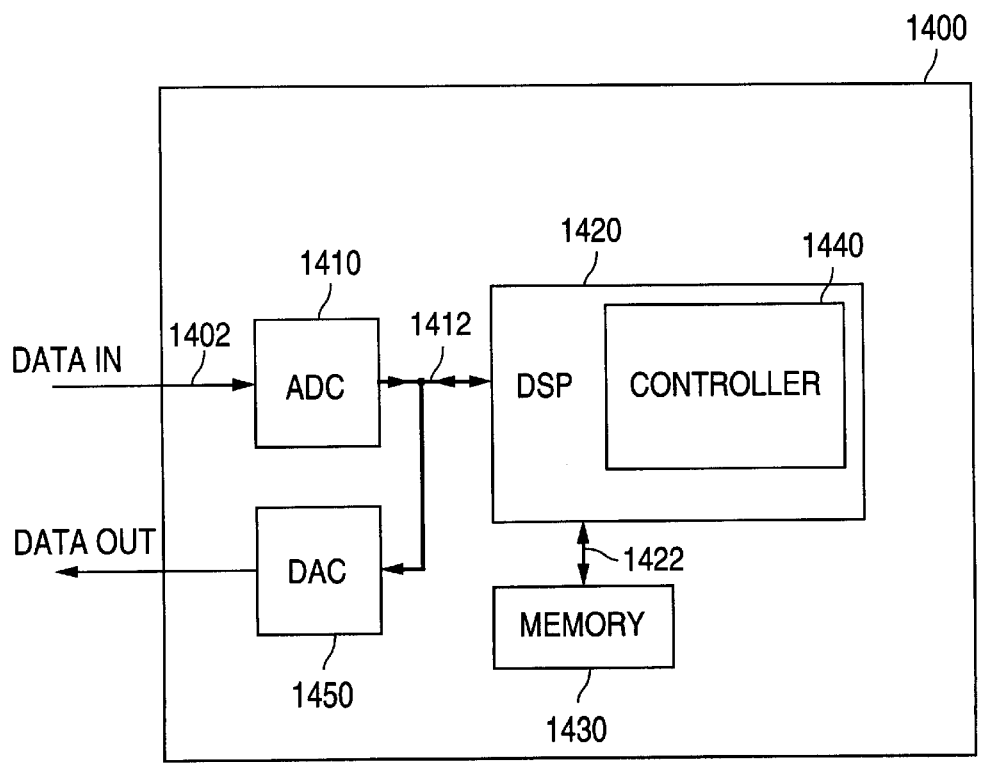
FIG. 14 is a block diagram of another preferred embodiment of a transceiver suitable for generating the TEQ and FEQ coefficients according to the methods shown in FIGS. 7, 11 and 12.

Turning to FIG. 14, another transceiver 1400 suitable for implementing the above-described functionality is described. Specifically, transceiver 1400 includes an analog-to-digital converter (ADC) 1410. Analog data is received from a channel over line 1402 and provided to ADC 1410. The ADC converts this analog data into a digital signal and provides the digital signal through bus 1412 to digital signal processor (DSP) 1420. The DSP 1420, saves the received data into memory 1422. Specifically, the DSP provides the received data over bus 1422 to memory 1430.

The DSP 1420 includes control circuitry. Specifically, DSP 1420 includes a controller 1440. Controller 1440 provides commands to DSP 1420.

The commands include one or more machine instructions. In response to such commands, DSP 1420 calculates the TEQ and FEQ coefficients according to the above-described processes. In addition, controller 1440 may provide commands to DSP 1420 for calculating channel loading and for calculating updates to the TEQ and FEQ coefficients.

In addition, transceiver 1400 includes a digital-to-analog convertor (DAC) 1450. Data is provided by DSP 1420 to DAC 1450 over bus 1412. This allows transceiver 1400 to send data over a channel. Since transceiver 1400 includes both transmitting and receiving capabilities, it may function as a decoder, as a transmitter, or as both.

In addition to the preferred embodiments shown in FIGS. 13 and 14, a transceiver according to the invention may also be implemented as part of a host processor. In such a preferred embodiment, the digital signal processor and the controller are both implemented on the host processor.

Although the invention has been described with reference to specific methods and equations, those of ordinary skill in the art will understand that the same functionality may be performed using equivalent methods and equations, or using modifications to the methods and equations described herein. In addition, although specific architectural configurations have been described, those of ordinary skill in the art will understand that the same functionality may be performed using many other architectural configurations, or using modifications to the architectural configurations described herein. All such equivalents and modifications are intended to be encompassed within the following claims.

What is claimed is:

1. A method of operating a decoder in a DMT system, comprising:

detecting a plurality of training sequences received via a channel by detecting an increase in energy level using a plurality of samples;

averaging the detected plurality of detected training sequences to provide an averaged training sequence;

circularly convolving the averaged training sequence with the transmitted training sequence to provide the estimated channel impulse response that includes a circular shift; and determining a frame delay based upon the circular shift.

2. The method of claim 1, and wherein the step of averaging the detected plurality of training sequences is performed on-line and is terminated after the averaged training sequence converges.

3. The method of claim 1, and wherein the step of determining the frame delay comprises:
   determining the energy of each of a plurality of windows within the estimated channel impulse response; and
   comparing the respective energies of each of the plurality of windows within the estimated channel impulse response.

4. The method of claim 3, and wherein the step of determining the frame delay further comprises selecting a minimum energy window from one of the plurality of windows.

5. The method of claim 1, and further comprising:
   calculating TEQ coefficients off-line using an LMS algorithm, wherein the LMS algorithm approximately minimizes a difference between a desired channel impulse response and the estimated channel impulse response convolved with the TEQ coefficients; and
   calculating FEQ coefficients off-line based upon the TEQ coefficients and an averaged training sequence.

6. The method of claim 5, and wherein the step of calculating TEQ coefficients comprises:
   repeatedly updating the TEQ coefficients based upon the desired channel impulse response, the estimated channel impulse response, and a previous value of the TEQ coefficients; and
   repeatedly updating the desired channel impulse response based upon a previous desired channel impulse response and the TEQ coefficients.

7. The method of claim 6, and wherein the step of calculating the TEQ coefficients further comprises repeatedly scaling the TEQ coefficients based upon the desired channel impulse response and the estimated channel impulse response.

8. The method of claim 5, and wherein the step of calculating the FEQ coefficients comprises a circularly convolving the TEQ coefficients to provide filtered data.

9. The method of claim 8, and wherein the step of calculating the FEQ coefficients further comprises performing an FFT on the filtered data.

10. The method of claim 1, and further comprising:
    calculating TEQ coefficients off-line using an eigenvalue algorithm; and
    calculating FEQ coefficients off-line based upon the TEQ coefficients and an averaged training sequence.

11. A method of generating TEQ and FEQ coefficients in a DMT system, the system comprising:
    detecting a plurality of sequences received through a channel by detecting a change in energy comprises measuring energy over a plurality of samples.;
    averaging the detected plurality of sequences to provide an averaged sequence;
    determining an estimated channel impulse response for the channel based upon the averaged sequence;
    determining a frame delay based upon the estimated channel impulse response;
    calculating TEQ coefficients based upon the estimated channel impulse response and a desired channel impulse response; and
    calculating FEQ coefficients based upon the calculated TEQ coefficients.

12. The method of claim 11, and wherein the step of averaging comprises terminating the step of averaging after the averaged sequence converges.

13. The method of claim 11, and wherein the step of determining the estimated channel impulse response comprises circularly convolving the averaged sequence with a training sequence.

14. The method of claim 13, and wherein the step of circularly convolving the averaged sequence with a training sequence comprises circularly convolving the averaged sequence with a pseudo-random noise signal.

15. The method of claim 11, and wherein the step of determining the frame delay comprises the steps of:
    determining an energy content of a plurality of windows within the estimated channel impulse response;
    selecting one window based upon a comparison of the respective energy contents of each of the plurality of windows;
    finding a transition from a last sample of the estimated channel impulse response to a first sample of the estimated channel impulse response based upon the selected one window; and
    calculating a time from a start of the estimated channel impulse response to the transition, wherein the time from the start of the estimated channel impulse response to the transition is the frame delay.

16. The method of claim 15, and wherein the step of selecting one window comprises selecting one window having a minimum energy content.

17. The method of claim 11, and wherein the step of calculating the TEQ coefficients comprises:
    repeatedly updating the TEQ coefficients based upon the desired channel impulse response, the estimated channel impulse response, and a previous value of the TEQ coefficients; and
    repeatedly updating the desired channel impulse response based upon a previous desired channel impulse response and the TEQ coefficients.

18. The method of claim 17, and wherein the step of calculating the TEQ coefficients further comprises repeatedly scaling the TEQ coefficients based upon the desired channel impulse response and the estimated channel impulse response.

19. The method of claim 11, and wherein the step of calculating the FEQ coefficients comprises circularly convolving the TEQ coefficients to provide filtered data.

20. The method of claim 19, and wherein the step of calculating the FEQ coefficients further comprises performing an FFT on the filtered data.

21. The method of claim 11, and wherein the step of calculating TEQ coefficients comprises performing an LMS algorithm.

22. The method of claim 11, and wherein the step of calculating TEQ coefficients comprises performing an eigenvalue algorithm.

23. The method of claim 11, and further comprising the steps of:
    calculating a channel loading distribution based upon the detected plurality of sequences;
    updating the calculated TEQ coefficients based upon changes in the channel; and
    updating the calculated FEQ coefficients based upon changes in the channel.

24. A decoder suitable for generating TEQ and FEQ coefficients in a DMT system, the decoder comprising:
    an analog-to-digital converter configured to receive an analog signal through a channel and convert the analog signal into a digital signal;

a digital signal processor operationally coupled with the analog-to-digital converter and configured to receive the digital signal; and a controller operationally coupled with the digital signal processor and configured to provide commands to the digital signal processor, wherein the commands include:

instructions directing the digital signal processor to detect a change in energy level of the digital signal, wherein the change in energy level identifies the start of a plurality of received training sequences;

instructions directing the digital signal processor to calculate an average of the plurality of received training sequences;

instructions directing the digital signal processor to calculate an estimated channel impulse response based upon the average of the plurality of received training sequences;

instructions directing the digital signal processor to calculate a frame delay based upon the estimated channel impulse response;

instructions directing the digital signal processor to calculate TEQ coefficients based upon the estimated channel impulse response and a desired channel impulse response; and instructions directing the digital signal processor to calculate FEQ coefficients based upon the TEQ coefficients, wherein the instructions directing the digital signal processor to detect the change in energy level of the digital signal comprise instructions directing the digital signal processor to measure energy levels over a plurality of samples of the digital signal.

25. The decoder of claim 24, and wherein the instructions directing the digital signal processor to calculate the average of the plurality of received training sequences comprise instructions directing the digital signal processor to update the average of the plurality of received training sequences until convergence occurs.

26. The decoder of claim 25, and wherein the instructions directing the digital signal processor to calculate the estimated channel impulse response comprise instructions directing the digital signal processor to circularly convolves the average of the plurality of received training sequences with a transmitted training sequence, and wherein the estimated channel impulse response includes a circular shift.

27. The decoder of claim 25, and wherein the instructions directing the digital signal processor to calculate the frame delay comprise:

instructions directing the digital signal processor to detect a change in energy level within the estimated channel impulse response;

instructions directing the digital signal processor to measure an amount of time from a start of the channel impulse response to the change in energy level; and instructions directing the digital signal processor to set the frame delay equal to the amount of time from the start of the channel impulse response to the change in energy level.

28. The decoder of claim 25, and wherein the instructions directing the digital signal processor to calculate TEQ coefficients comprise:

instructions directing the digital signal processor to repeatedly update the TEQ coefficients based upon the desired channel impulse response, the estimated channel impulse response, and a previous value of the TEQ coefficients;

instructions directing the digital signal processor to repeatedly update the desired channel impulse response based upon a previous desired channel impulse response and the TEQ coefficients; and instruction directing the digital signal processor to repeatedly scale the TEQ coefficients based upon the desired channel impulse response and the estimated channel impulse response, which the instructions directing the digital signal processor to calculate TEQ coefficients follow an LMS algorithm.

29. The decoder of claim 25, and wherein the instructions directing the digital signal processor to calculate the TEQ coefficients follow an eigenvalue algorithm.

30. The decoder of claim 25, and wherein the instructions directing the digital signal processor to calculate FEQ coefficients comprise:

instructions directing the digital signal processor to perform a circular convolution with the TEQ coefficients to generate filtered data; and instructions directing the digital signal processor to perform an FFT on the filtered data.

31. The decoder of claim 25, and wherein the commands provided by the controller to the digital signal processor further include:

instructions directing the digital signal processor to calculate a channel loading distribution based upon the plurality of received training sequences;

instructions directing the digital signal processor to update the TEQ coefficients based upon changes in the channel; and instructions directing the digital signal processor to update the FEQ coefficients based upon changes in the channel.

32. The decoder of claim 31, and further comprising a digital-to-analog converter operationally coupled with the digital signal processor, wherein the digital-to-analog converter is configured to transmit data through the channel.

33. The decoder of claim 25, and further comprising a bus connected between the digital signal processor and the controller, wherein commands from the controller are provided to the digital signal processor through the bus.

* * * * *